United States Patent [19]
Aikawa

[11] Patent Number: 5,647,128
[45] Date of Patent: Jul. 15, 1997

[54] METHOD OF MANUFACTURING PAPER MAKING SCREEN PLATE

[75] Inventor: Yoshihiko Aikawa, Shizuoka, Japan

[73] Assignee: Aikawa Iron Works Co., Ltd., Shizuoka, Japan

[21] Appl. No.: 488,896

[22] Filed: Jun. 12, 1995

[30] Foreign Application Priority Data

Dec. 28, 1994 [JP] Japan .................................. 6-328815

[51] Int. Cl.⁶ .................................................. B23P 15/16
[52] U.S. Cl. ...................... 29/896.62; 209/395; 209/405
[58] Field of Search .......................... 29/896.62, 896.6; 162/55, 251; 209/488, 497.01; 210/395, 400, 405, 406, 412

[56] References Cited

U.S. PATENT DOCUMENTS

| | | | |
|---|---|---|---|
| 3,684,099 | 8/1972 | Kiebach | 210/488 |
| 4,828,689 | 5/1989 | Lamort | 209/395 |
| 5,415,294 | 5/1995 | Nagaoka | 209/395 |

FOREIGN PATENT DOCUMENTS

| | | | |
|---|---|---|---|
| 25289 | 10/1931 | Netherlands | 29/163.6 |
| 760457 | 10/1956 | United Kingdom | 210/488 |

*Primary Examiner*—P. W. Echols
*Attorney, Agent, or Firm*—Kanesaka & Takeuchi

[57] ABSTRACT

In a method of manufacturing a paper making screen plate, a plurality of first and second longitudinal members is prepared. Each first longitudinal member has a plurality of first cylindrical projections and at least one first cylindrical recess situated between the first cylindrical projections. The first and second longitudinal members have circular shapes in cross section throughout substantially entire lengths thereof. Both ends of the respective first and second longitudinal members are disposed on and fixed to first and second support members. The first and second longitudinal members are arranged alternately and parallel to each other so that the cylindrical projections of the first longitudinal members abut against the second longitudinal members and the first cylindrical recess forms a slit relative to the second longitudinal member facing thereto. Each slit has wide outer portions and a narrow middle portion between the wide outer portions and is defined by smooth curved surfaces of first and second longitudinal members. The paper making screen plate can be easily manufactured.

9 Claims, 14 Drawing Sheets

METHOD OF MANUFACTURING PAPER MAKING SCREEN PLATE

BACKGROUND OF THE INVENTION

1. Field of the Invention

The present invention relates to a method of manufacturing a paper making screen plate and more specifically, to a method of manufacturing a paper making screen plate by which the screen plate can be easily manufactured.

2. Description of the Prior Art

The applicant discloses a method of manufacturing a paper making screen plate by forming slits by locating bar-shaped members near to each other in Japanese Patent Publication Laid-Open No. 6 (1994)-299490.

The paper making screen plate disclosed in the publication includes bar-shaped members having a circular cross section, a first support member having receiving portions for the bar-shaped members which are annularly formed thereto at intervals and a second support member having receiving portions for the bar-shaped members which are annularly formed thereto at intervals. The bar-shaped members are annularly disposed near to each other as well as the ends on one side of the bar-shaped members are abutted against the receiving portions of the first support member and the ends on the other side of the bar-shaped members are abutted against the receiving portions of the second support member, respectively, and the abutted portions are fixed by welding or the like.

Since the receiving portions of the first and second support members are arranged as a plurality (for example, about 250 pieces–about 300 pieces) of circular holes formed thereto, although the holes must be formed to the first support member and the second support member at predetermined intervals (for example, about 0.05 mm–about 0.5 mm, there is a problem that a job for forming the holes is very time-consuming and workability of the job is not good.

In particular, when the bar-shaped members have a small diameter although the first support member must be accurately aligned with the second support member as well as the degree of parallelism of the adjacent bar-shaped members must be accurately adjusted, there arise problems in that these requirements cannot be easily and promptly satisfied and further when the adjacent holes are located near to each other, it is difficult to form the holes (receiving portions) from the view point of strength.

SUMMARY OF THE INVENTION

An object of the present invention is to provide a method of manufacturing a paper making screen plate and the paper making screen plate by which the aforesaid conventional problems can be removed.

An object of the present invention is to provide a method of manufacturing a paper making screen plate capable of accurately and easily forming slits having a predetermined size between longitudinal members and thus obtaining a screen plate which can be easily manufactured, which method comprises the steps of disposing a plurality of the longitudinal members in parallel with each other so that the recesses of the longitudinal members are caused to confront the recesses of said longitudinal members and the projections of the longitudinal members are abutted against the projections of the longitudinal members and fixing the longitudinal members to each other.

An object of the present invention is to provide a method of manufacturing a paper making screen plate capable of accurately and easily forming slits having a predetermined size between first longitudinal members and second longitudinal members and thus obtaining a screen plate which can be easily manufactured, which method comprises the steps of alternatively disposing a plurality of the first longitudinal members and a plurality of the second longitudinal members in parallel with each other so that the projections of the first longitudinal members are abutted against the recesses of the second longitudinal members and the projections of the second longitudinal members are abutted against the recesses of the first longitudinal members, respectively and the recesses of the first longitudinal members are caused to confront the recesses of the second longitudinal members, and fixing the first longitudinal members to the second longitudinal members.

An object of the present invention is to provide a method of manufacturing a paper making screen plate capable of accurately and easily forming slits having a predetermined size between first longitudinal members and second longitudinal members and thus obtaining a screen plate which can be easily manufactured, which method comprises the steps of disposing the first longitudinal members and the second longitudinal members in parallel with each other so that the projections of the first longitudinal members are abutted against the surfaces of the second longitudinal members and the recesses of the first longitudinal members are caused to confront the surfaces of the second longitudinal members, further alternately disposing a plurality of the first longitudinal members and the plurality of the second longitudinal members, and fixing the first longitudinal members to the second longitudinal members.

An object of the present invention is to provide a method of manufacturing a paper making screen plate capable of accurately and easily forming slits having a predetermined size between longitudinal members and thus obtaining a screen plate which can be easily manufactured, which method comprises the steps of disposing a plurality of the longitudinal members in parallel with each other so that the recesses of the longitudinal members are caused to confront the recesses of the longitudinal members and the projections of the longitudinal members are abutted against the projections of the longitudinal members, and fixing the ends on one side of the plurality of the longitudinal members disposed in parallel with each other to a first support member and the ends on the other side of a plurality of the longitudinal members disposed in parallel with each other to a second support member, respectively.

An object of the present invention is to provide a method of manufacturing a paper making screen plate capable of accurately and easily forming slits having a predetermined size between first longitudinal members and second longitudinal members and thus obtaining a screen plate which can be easily manufactured, which method comprises the steps of disposing the first longitudinal members and the second longitudinal members in parallel with each other so that the projections of the first longitudinal members are abutted against the recesses of the second longitudinal members and the projections of the second longitudinal members are abutted against the recesses of the first longitudinal members, respectively and the recesses of the first longitudinal members are caused to confront the recesses of the second longitudinal members, further alternately disposing a plurality of the first longitudinal members and a plurality of the second longitudinal members, and fixing the ends on one side of the plurality of the first longitudinal members and the plurality of the second longitudinal members to a first support member and fixing the ends on the other side of the plurality of the first longitudinal members and the plurality of the second longitudinal members to a second support member, respectively.

An object of the present invention is to provide a method of manufacturing a paper making screen plate capable of accurately and easily forming slits having a predetermined size between longitudinal members and thus obtaining a screen plate which can be easily manufactured, which method comprises the steps of disposing the first longitudinal members and the second longitudinal members in parallel with each other so that the projections of the first longitudinal members are abutted against the surface of the second longitudinal members and the recesses of the first longitudinal members are caused to confront the surfaces of the second longitudinal members, further alternately disposing a plurality of the first longitudinal members and a plurality of the second longitudinal members, and fixing the ends on one side of the plurality of the first longitudinal members and the plurality of the second longitudinal members to a first support member and the ends on the other side of the plurality of the first longitudinal members and the plurality of the second longitudinal members to a second support member, respectively.

An object of the present invention is to provide a method of manufacturing a paper making screen plate capable of accurately and easily forming slits having a predetermined size between longitudinal members and thus obtaining a screen plate which can be easily manufactured, which method comprises the steps of disposing a plurality of the longitudinal members in parallel with each other so that the recesses of the longitudinal members are caused to confront the recesses of the longitudinal members and the projections of the longitudinal members are abutted against the projections of the longitudinal members, fixing the ends on one side of the plurality of the longitudinal members disposed in parallel with each other to a first support member and the ends on the other side of the plurality of the longitudinal members disposed in parallel with each other to a second support member, respectively.

DESCRIPTION OF PREFERRED EMBODIMENTS

An embodiment of the present invention will be described with reference to the drawings. In FIG. 1 to FIG. 7, numeral 1 denotes a paper making screen which is referred to as an inward flow screen for, for example, causing a material to flow from the outside of a screen plate 10 toward the inside thereof to refine the material. The paper making screen is partitioned to a primary chamber 4 and a secondary chamber 5 by the screen plate 10 disposed in a casing 2.

Figure 1:
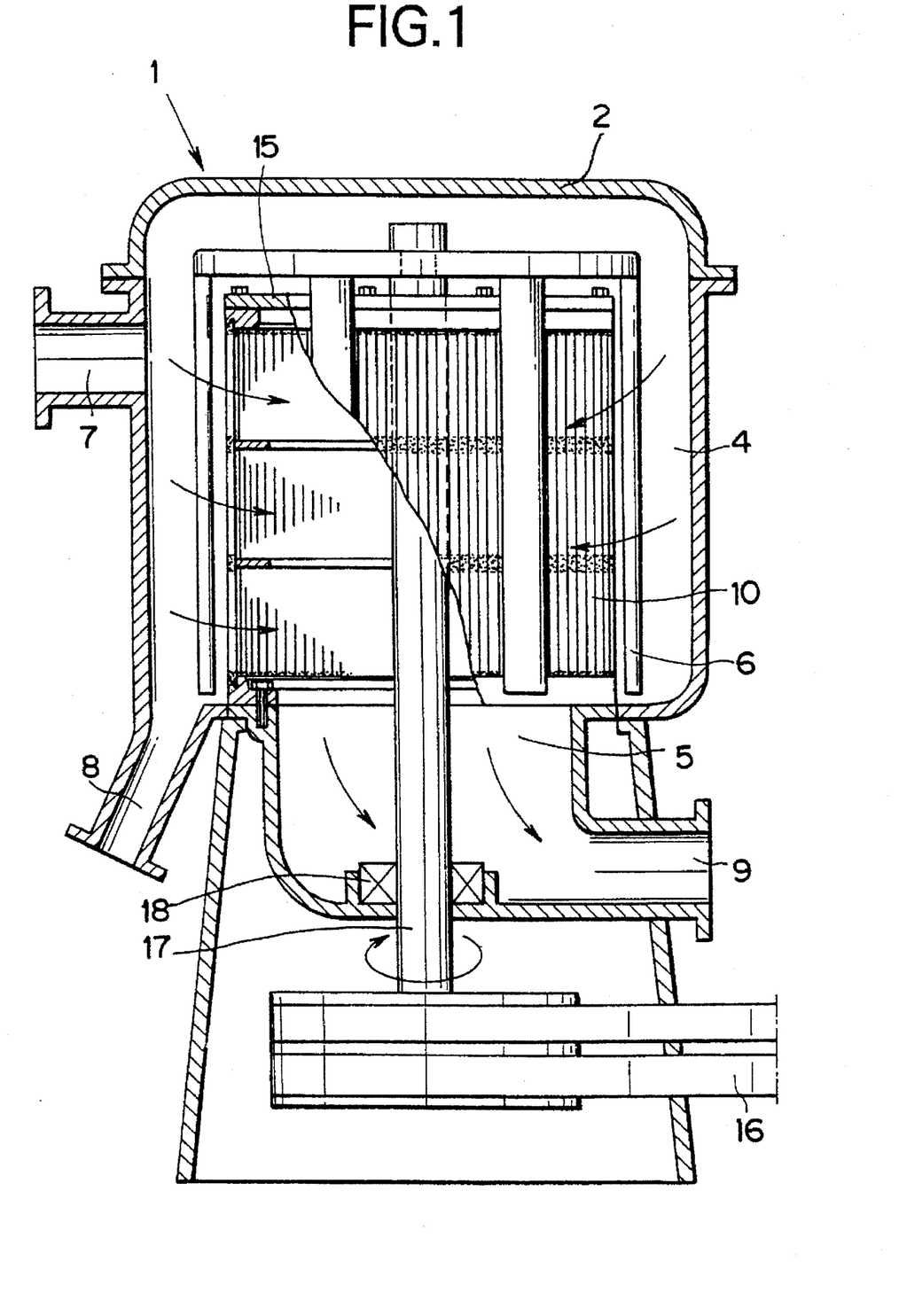
FIG. 1 is a schematic cross sectional view of a screen having a screen plate manufactured by the method of manufacturing the paper making screen plate of the embodiment of the present invention.

The primary chamber 4 is provided with a stirring member 6 and communicates with a material inlet 7 and a foreign substance outlet 8.

The secondary chamber 5 communicates with a material outlet 9 for discharging a refined material from which foreign substances are removed by the screen plate 10.

Figure 2:
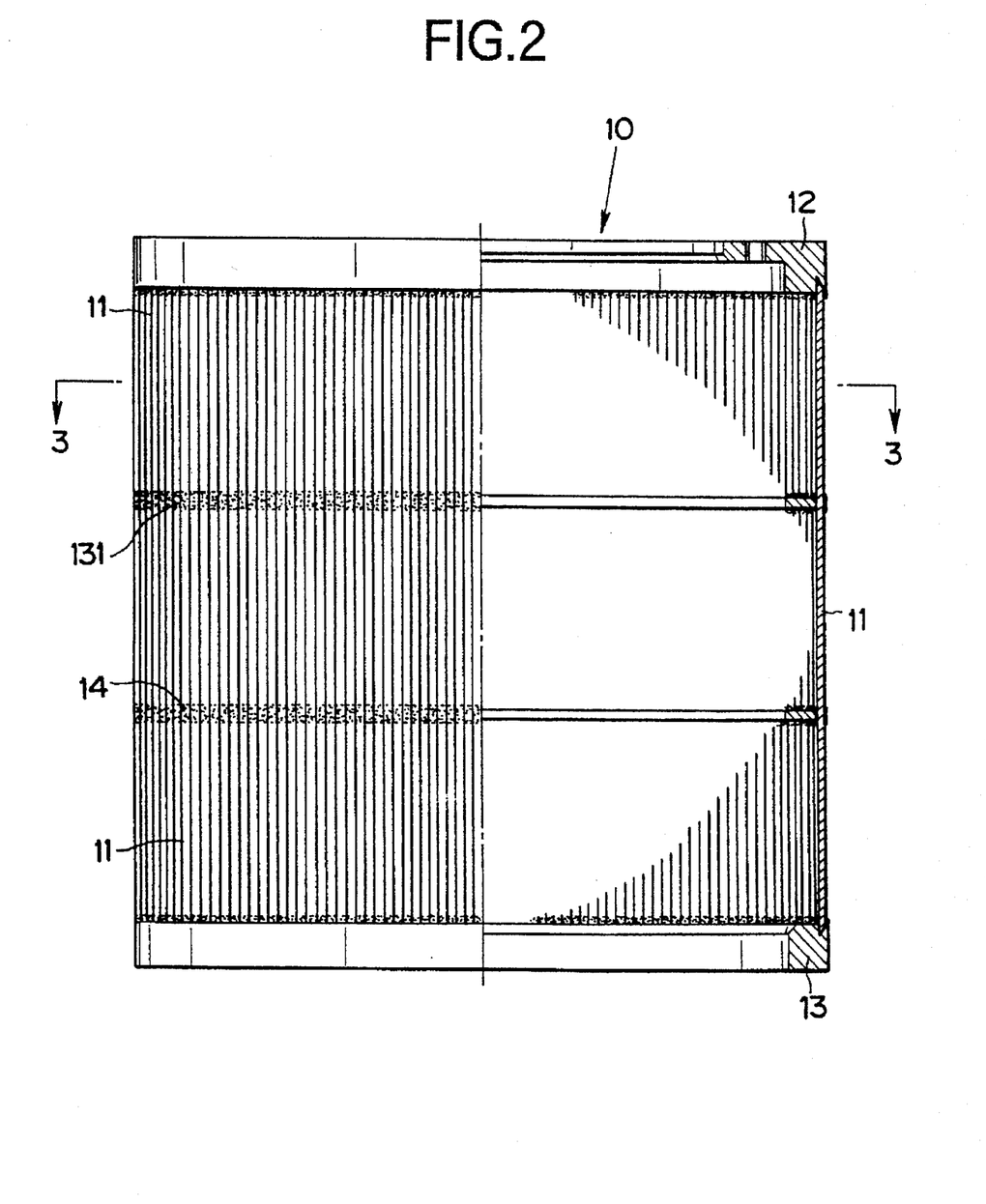
FIG. 2 is a schematic cross sectional view showing the screen plate of FIG. 1 in enlargement.
Figure 3:
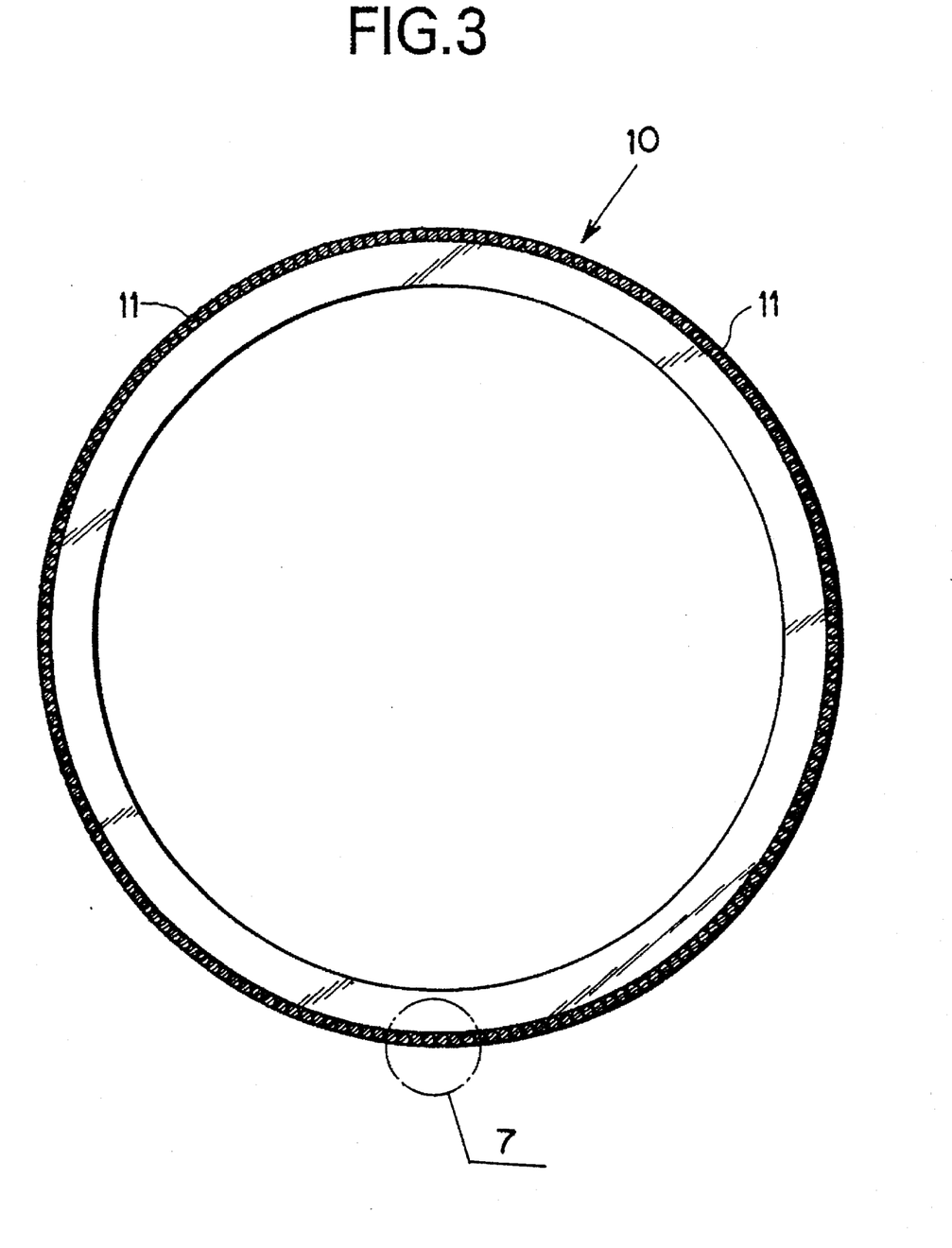
FIG. 3 is a schematic cross sectional view taken along the line 3—3 of FIG. 2.

The screen plate 10 is arranged such that a plurality of longitudinal members 11 are disposed in parallel with each other and the ends on one side of the longitudinal members 11 are fixed to a support member 12 and the ends on the other side of longitudinal members 11 are fixed to a second support member 13, respectively by welding or the like.

Each of the longitudinal members 11 is made of stainless steel (or iron) having, for example, a circular cross section and a diameter of, for example, about 2.5 mm–about 6.0 mm, and recesses a and projections b are continuously formed on the longitudinal member 11 in the longitudinal direction thereof with at least two pieces of the recesses a. Note, the cross section of the longitudinal member 11 is not limited to the circle but it may be formed to any polygon such as, for example, a rectangle, square, rhombus or the like.

Figure 6:
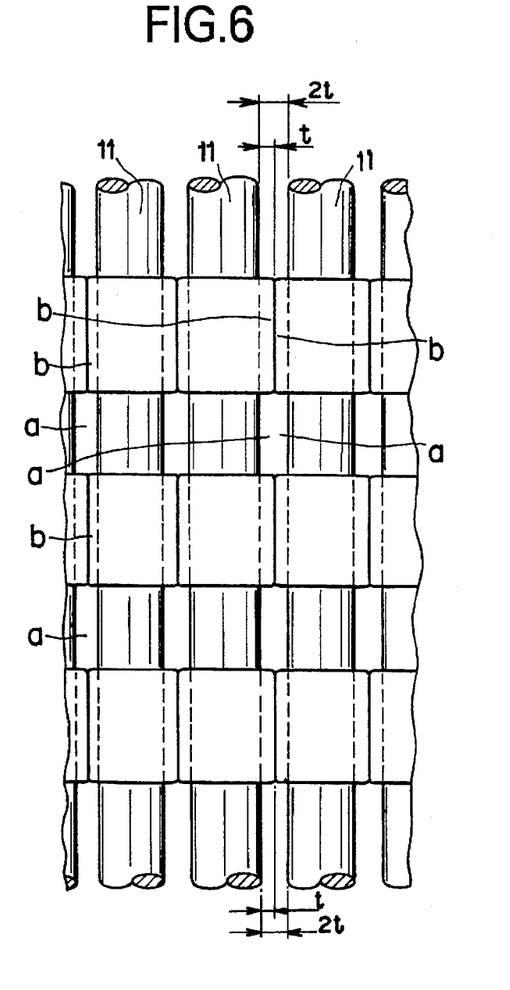
FIG. 6 is a view schematically explaining the state that a plurality of longitudinal members is disposed in parallel with each other.
Figure 7:
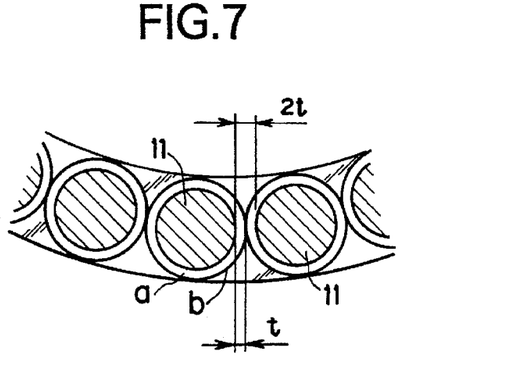
FIG. 7 is a schematic enlarged view of a portion 7 in FIG. 3.

As shown in FIG. 6, a slit 2t formed by the longitudinal members 11 contacting with each other is determined by a type of the material to be refined by the paper making screen 1, foreign substances contained in the material, and the like and set to about 0.05 mm to about 0.50 mm.

A method of continuously forming the recesses a and the projections b on the surface of the longitudinal member 11 in the longitudinal direction thereof includes, for example, an electro-polishing method (the recesses a are formed in such a manner that the longitudinal member 11 is dipped into an acid solution with a tape applied to the portions which are not desired to be melted (the projections b) and a current is supplied thereto to electro-chemically polish the surface of the longitudinal member 11), a cutting method, a plating method, a metal deposition method and the like.

As shown in FIG. 6, a plurality of the longitudinal members 11 is disposed in parallel with each other so that the recesses a of the longitudinal members 11 are caused to confront the recesses a of the longitudinal members 11 and the projections b of the longitudinal members 11 are abutted against the projections b of the longitudinal members 11. Note, the ends on one side of the longitudinal members 11 are fixed to the first support member 12 and the ends on the other side of the longitudinal members 11 are fixed to the second support member 13, respectively by welding or the like (refer to FIG. 2).

Figure 4:
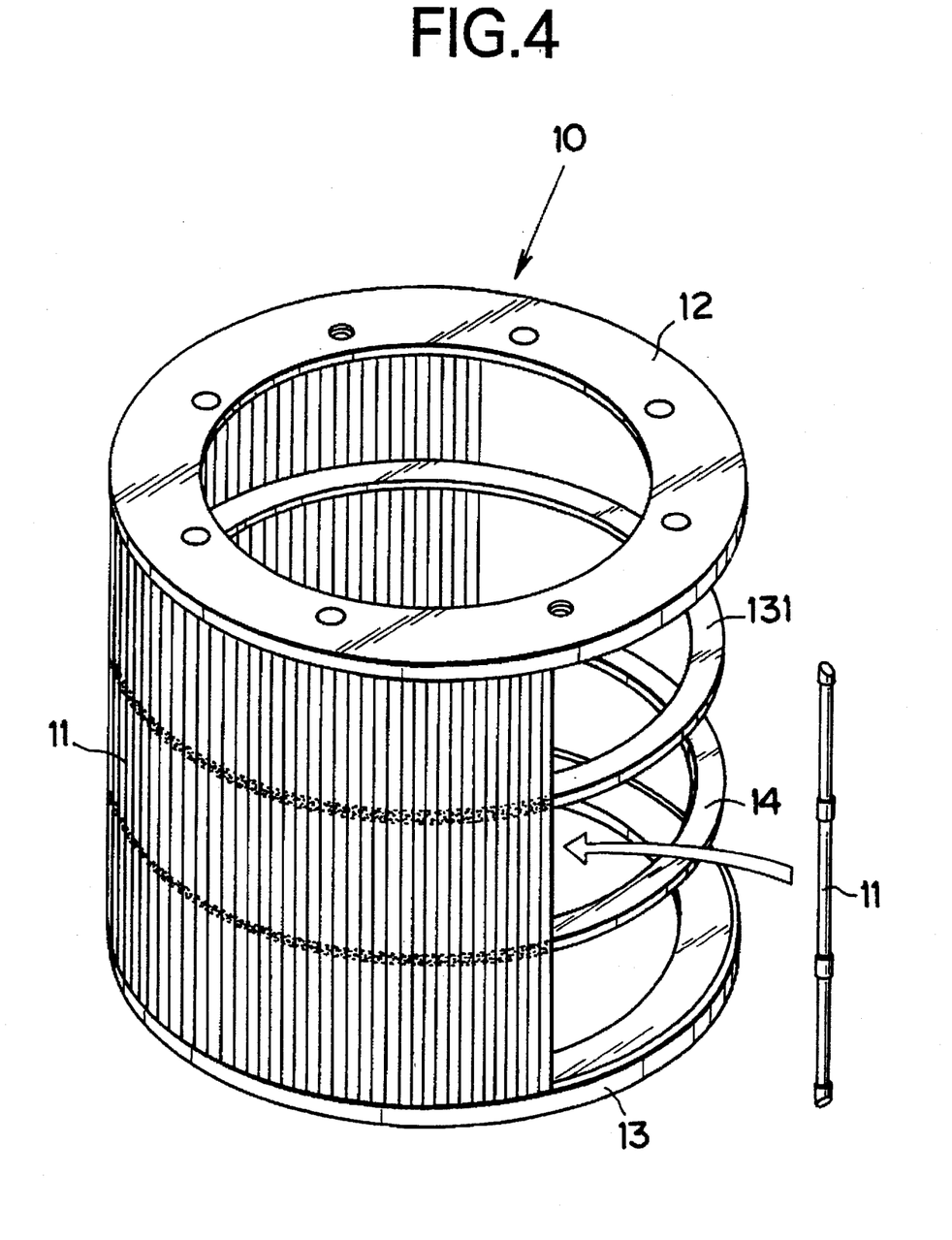
FIG. 4 is a view schematically explaining the method of manufacturing the paper making screen plate.
Figure 5:
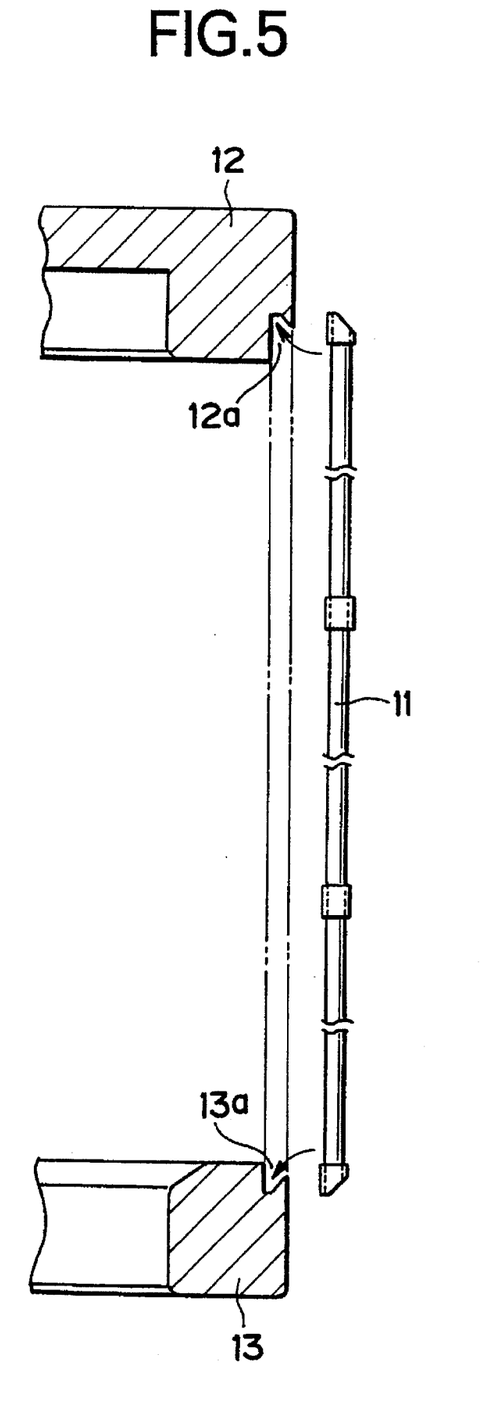
FIG. 5 is a view schematically explaining the method of manufacturing the paper making screen plate.

As shown in FIG. 4, the first support member 12 and the second support member 13 are formed to an annular shape, and grooves 12a, 13a are formed to the outside of the annular portions of the first support member 12 and the second support member 13 as shown in FIG. 5 so that they have a shape which conforms to the end shape of the longitudinal member 11 to easily position it.

Support members are suitably disposed between the first support member 12 and the second support member 13 depending upon the length of the longitudinal member 11, and in this embodiment a third support member 131 and a fourth support member 14 are disposed (note, the longitudinal members 11 are fixed to the third support member 131 and the fourth support member 14 by welding or the like).

Note, the upper portion of the screen plate 10 is closed by, for example, a roof plate 15 and the stirring member 6 is connected to a shaft 17 to be rotated by a belt 16. Note, numeral 18 denotes a bearing.

Consequently, to make the screen plate 10 having gaps of the slit 2t, about 250 to 300 pieces of the longitudinal members 11 each having the recesses a and the projections b continuously formed on the surface thereof (a difference of height t is provided between the recess a and the projection b) with at least two pieces of the projections b is prepared, a plurality of the longitudinal members 11 are disposed in parallel with each other so that the recesses a of the longitudinal members 11 are sequentially caused to confront the recesses a of the longitudinal members 11 and the projections b of the longitudinal members 11 are sequentially abutted against the projections b of the longitudinal members 11, and the ends on both sides of the longitudinal members 11 are locked to the grooves 12a, 13a, respectively and fixed thereto by welding or the like.

Figure 8:
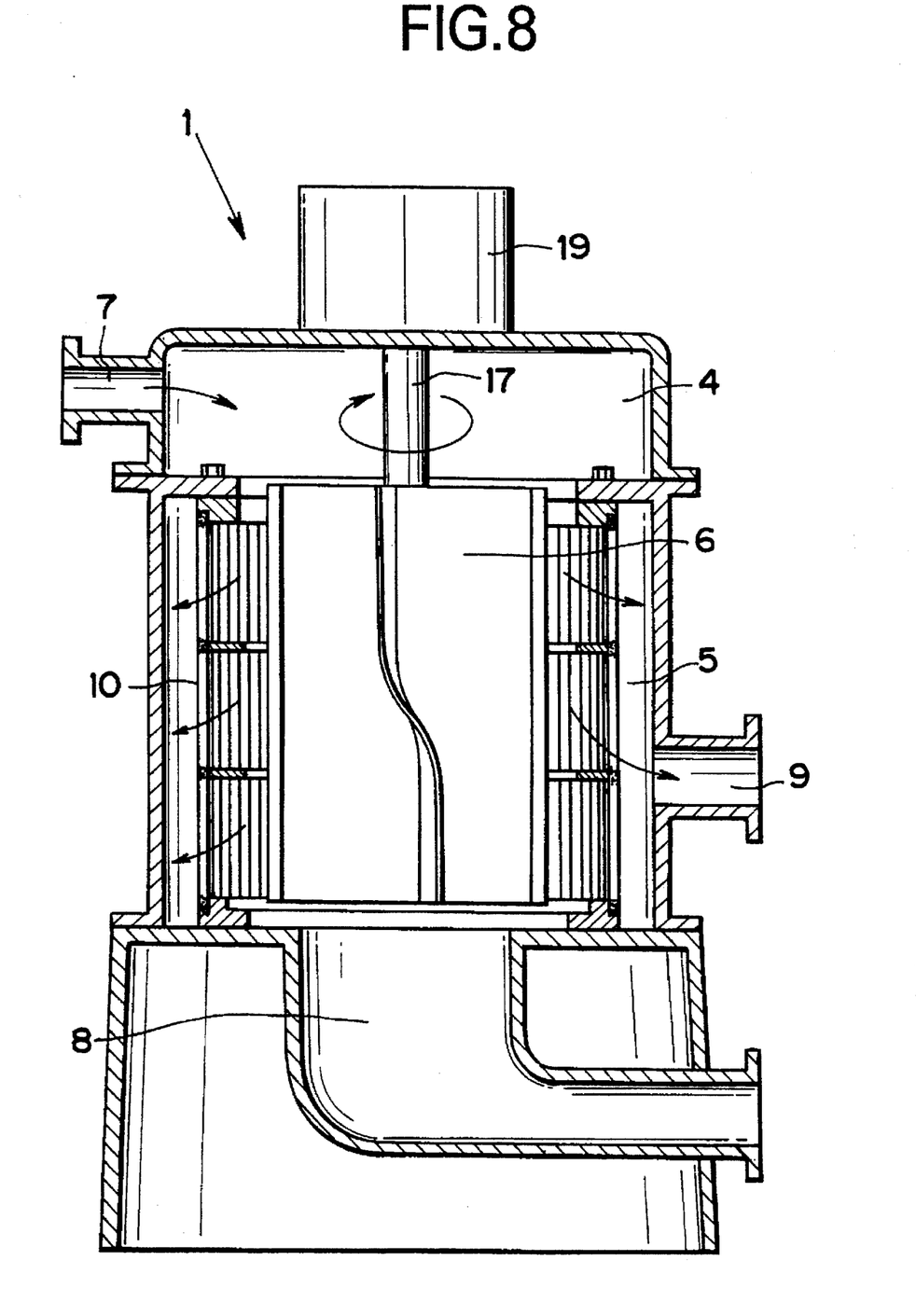
FIG. 8 is a schematic cross sectional view of a screen when the paper making screen plate of the embodiment of the present invention is applied to a type of the screen which is different from that shown in FIG. 1.

Note, although the aforesaid embodiment is referred to as the inward flow screen by which a material is flown from the outside of the screen plate 10 toward the inside thereof and refined, the present invention is not limited to this type of the screen but similarly applicable to the one referred to as an outward flow screen 1 as shown in FIG. 8 by which a material is flown from the inside of the screen plate 10 toward the outside thereof and refined.

The aforesaid roof plate 15 need not be provided with the screen plate 10 when the outward flow screen 1 is employed. Note, numeral 19 denotes a motor for rotating the stirring member 6 connected to the shaft 17.

Figure 9:
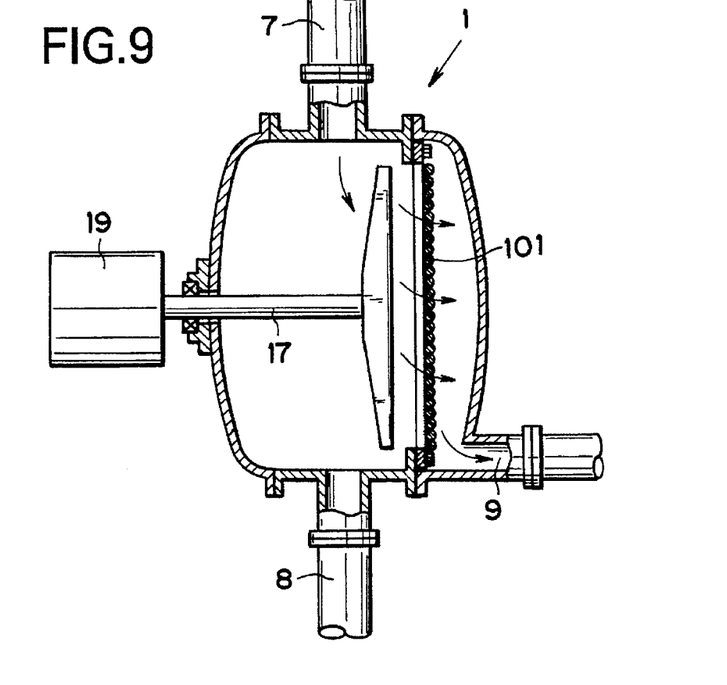
FIG. 9 is a schematic cross sectional view of a different screen.
Figure 10:
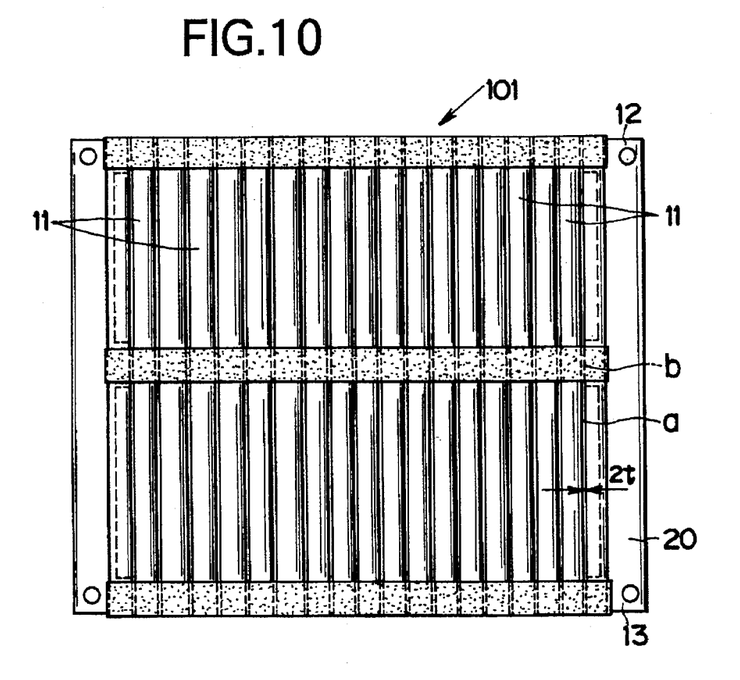
FIG. 10 is a schematic plan view of the screen plate of FIG. 9.
Figure 11:
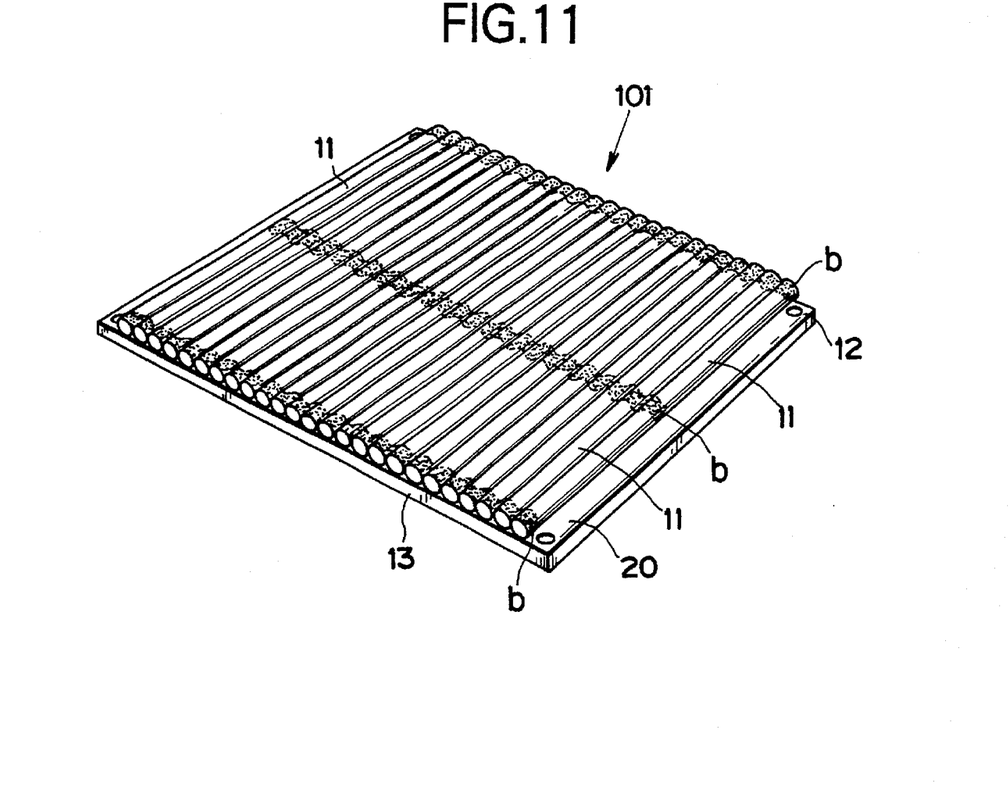
FIG. 11 is a schematic perspective view of a screen plate of FIG. 10.

Further, although the screen plate 10 of the aforesaid embodiment is formed to a cylindrical shape, the present invention is not limited thereto but similarly applicable to a flat screen plate 101 as shown in FIG. 9 to FIG. 11.

The flat screen plate 101 shown in FIG. 9 to FIG. 11 is arranged similarly to the screen plate shown FIG. 1 to FIG. 7 such that a plurality of longitudinal members 11 is disposed in parallel with each other so that the recesses a of the longitudinal members 11 are caused to confront the recesses a of the longitudinal members 11 and the projections b of the longitudinal members 11 are abutted against the projections b of the longitudinal members 11. The ends on one side of the longitudinal members 11 are fixed to a first support member 12 and the ends on the other side of the longitudinal members 11 are fixed to a second support member 13, respectively by welding or the like. The first support member 12 and the second support member 13 are composed of an integrally formed frame 20.

Figure 12:
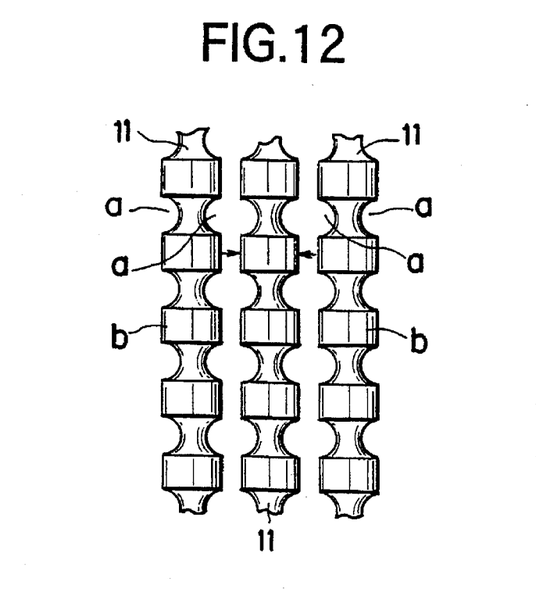
FIG. 12 is a view explaining a modification of the shape of the slits of the screen plate and shows the state that longitudinal members are separately disposed.
Figure 13:
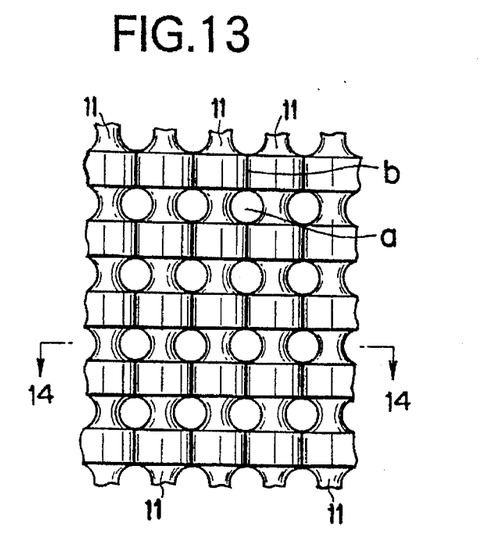
FIG. 13 is a view explaining the state that the longitudinal members shown in FIG. 12 are abutted to each other.
Figure 14:
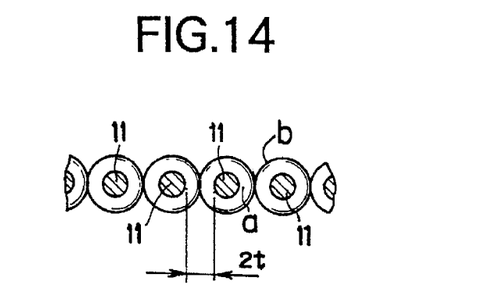
FIG. 14 is a schematic cross sectional view taken along the line 14—14 of FIG. 13.

Note, although the slit of the screen plate 10 of the aforesaid embodiment is formed to a rectangular shape, the slit of the present invention is not limited thereto but may be formed to, for example, a circular shape in such a manner that the cross section of the recess a is formed to a semicircle and the cross section of the projection b is formed to a shape surrounded by two semicircles as shown in FIG. 12 to FIG. 14.

Figure 15:
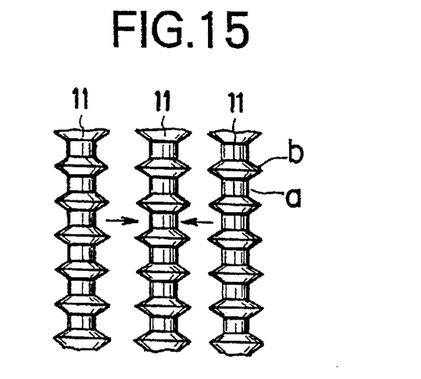
FIG. 15 is a view explaining another example of the shape of the slits of the screen plate and shows the state that longitudinal members are separately disposed.
Figure 16:
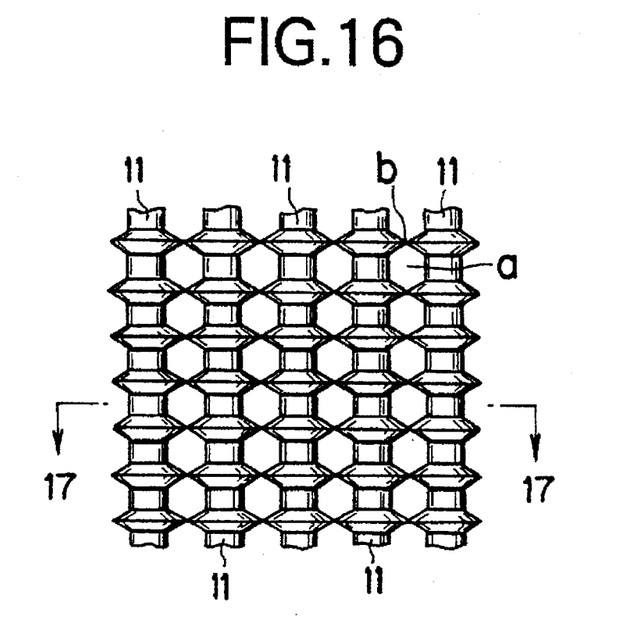
FIG. 16 is a view explaining the state that the longitudinal members shown in FIG. 15 are abutted against each other.
Figure 17:
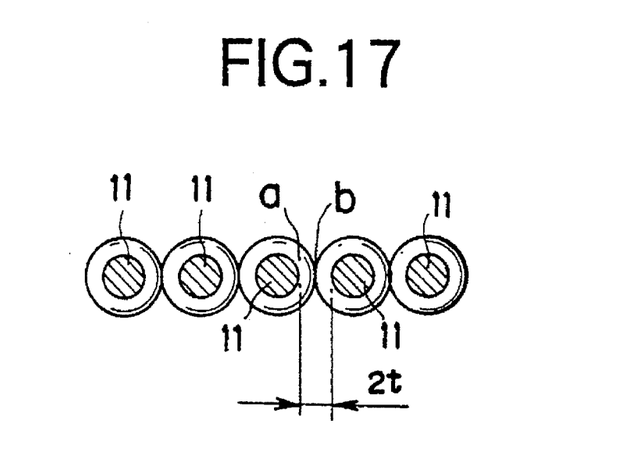
FIG. 17 is a schematic cross sectional view taken along the line 17—17 of FIG. 16.

As shown in FIG. 15 to FIG. 17, the slit may be formed to a polygon composed of a hexagon in such a manner that the cross section of the recess a is formed to a trapezoid and the cross section of the projection b is formed to a shape surrounded by two trapezoids.

Figure 18:
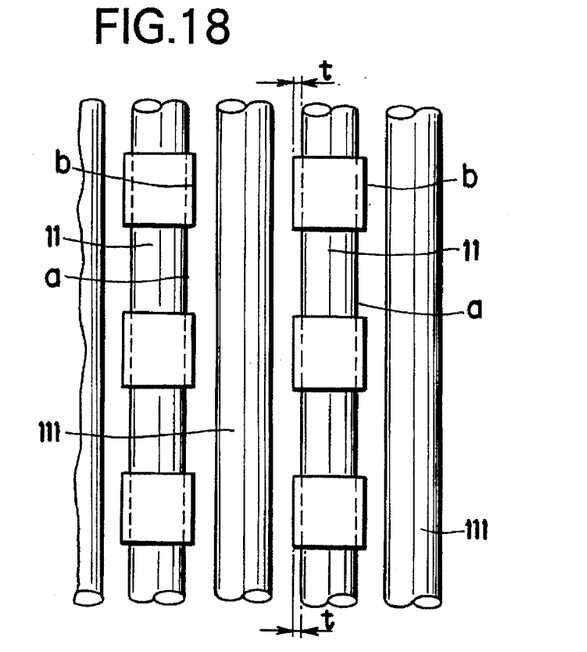
FIG. 18 is a view explaining a modification of the longitudinal members shown in FIG. 6 and shows that a first longitudinal member is disposed by being spaced apart from a second longitudinal member.
Figure 19:
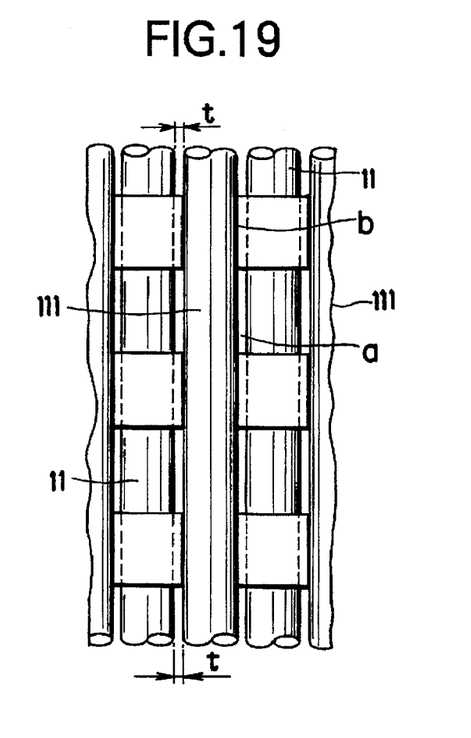
FIG. 19 is a view explaining the state that the first longitudinal member shown in FIG. 18 is abutted against the second longitudinal member shown there.

Although the screen plate 10 of the aforesaid embodiment is arranged such that a plurality of the longitudinal members 11 is disposed in parallel with each other so that the recesses a of the longitudinal members 11 are caused to confront the recesses a of the longitudinal member 11 and the projections b of the longitudinal members 11 are abutted against the projections b of the longitudinal members 11, the present invention is not limited to this arrangement but may be arranged such that, for example, there are prepared a plurality of first longitudinal members 11 each having recesses a and projections b continuously formed on the surface thereof with at least two pieces of the projections b and a plurality of second longitudinal members 111 each having a uniform surface without recesses and projections formed thereon as shown in FIG. 18, the first longitudinal members 11 and the second longitudinal members 111 are disposed in parallel with each other so that the projections b of the first longitudinal members 11 are abutted against the surface of the second longitudinal members 111 and the recesses a of the first longitudinal members 11 are caused to confront the surface of the longitudinal members 111 as shown in FIG. 19 and further the plurality of the first longitudinal members 11 and the plurality of the second longitudinal members 111 are alternately disposed.

Note, although not shown, the ends on one side of the plurality of the first and second longitudinal members 11, 111 disposed in parallel with each other are fixed to a first support member (not shown) similarly to the aforesaid embodiment and the ends on the other side of the plurality of the first and second longitudinal members 11, 111 disposed in parallel with each other are fixed to a second support member (not shown). As a result, slits t are formed between the first longitudinal members 11 and the second longitudinal members 111 (refer to FIG. 19).

Figure 20:
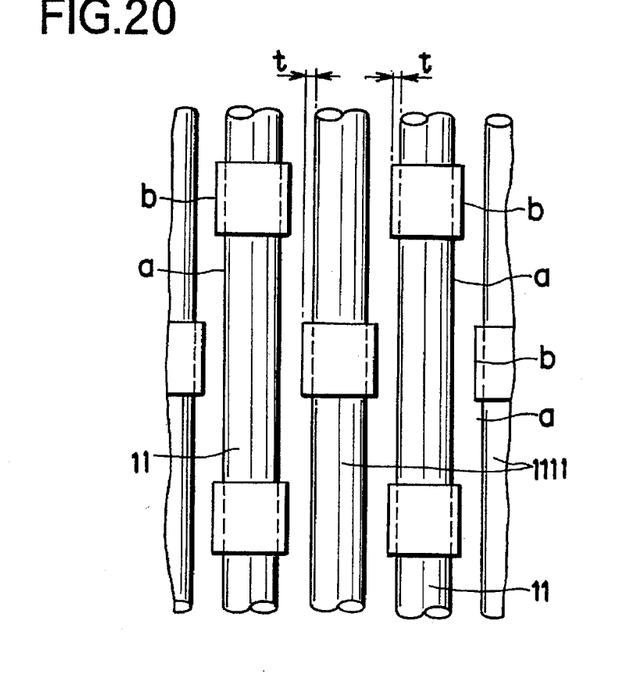
FIG. 20 is a view explaining a modification of the longitudinal members shown in FIG. 18 and shows that the first longitudinal member is disposed by being spaced apart from the second longitudinal member.
Figure 21:
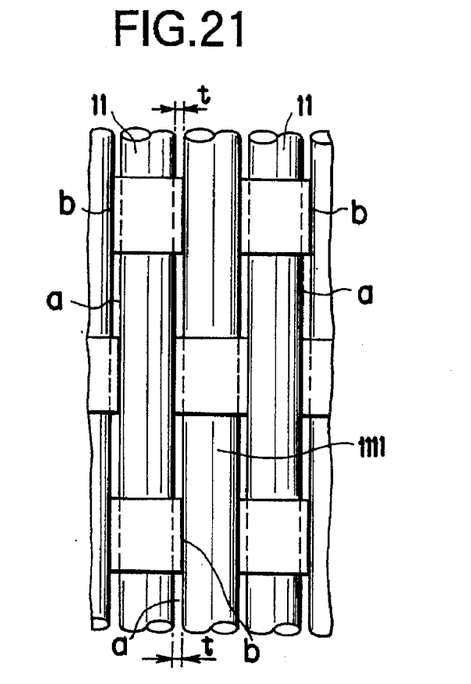
FIG. 21 is a view explaining the state that the first longitudinal member shown in FIG. 20 is abutted against the second longitudinal member shown there.

Further, there are prepared a plurality of first longitudinal members 11 each having recesses a and projections b continuously formed on the surface thereof with at least two pieces of the projections b and a plurality of second longitudinal members 1111 each having recesses a and projections b continuously formed on the surface thereof with at least two pieces of the projections b as shown in FIG. 20, the first longitudinal members 11 and the second longitudinal members 1111 are disposed in parallel with each other so that the projections b of the first longitudinal members 11 face the recesses a of the second longitudinal members 1111 and the projections b of the second longitudinal members 1111 face the recesses a of the first longitudinal members 11, respectively and the recesses a of the first longitudinal members 11 are caused to confront the recesses a of the longitudinal members 111 as shown in FIG. 21 and further the first and second longitudinal members 11, 1111 are alternately disposed.

Note, although not shown, the ends on one side of the plurality of the first longitudinal members 11 and the plurality of the second longitudinal members 1111 disposed in parallel with each other are fixed to a first support member (not shown) and the ends on the other side of the plurality of the first longitudinal members 11 and the plurality of the second longitudinal members 1111 disposed in parallel with each other are fixed to a second support member (not shown). As a result, slits t are formed between the first longitudinal members 11 and the second longitudinal members 1111 (refer to FIG. 21).

Figure 22:
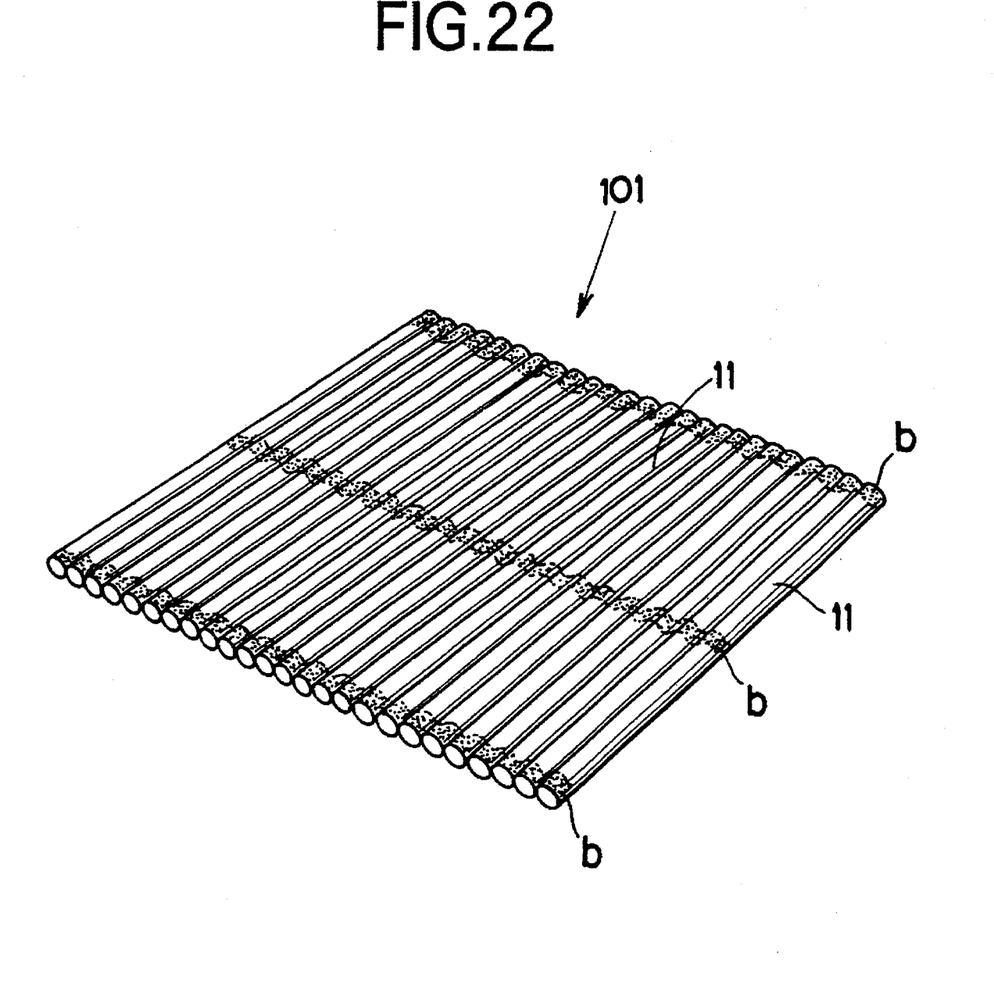
FIG. 22 is a view explaining the case that a screen plate is manufactured by fixing longitudinal members with each other without using support members.

The screen plate 10 of the aforesaid embodiment is provided with the first support member 12 and the second support member 13, but the embodiment is not limited thereto. It is possible, for example, that the longitudinal members 11 are fixed with each other and the support members such as the first support member 12, the second support member and the like are omitted as shown in FIG. 22.

That is, it is possible that a plurality of longitudinal members 11 each having recesses a and projections b continuously formed on the surface thereof with at least two pieces of the projections b are disposed in parallel with each other so that the recesses a of the longitudinal members 11 are caused to confront the recesses a of the longitudinal members 11 and the projections b of the longitudinal members 11 are abutted against the projections b of the longitudinal members 11 and the longitudinal members 11 are fixed with each other by welding or the like.

Likewise, it is possible that the first longitudinal members 11 shown in FIG. 18 and FIG. 19 are fixed to the second longitudinal members 111 shown there or the first longitudinal members 11 shown in FIG. 20 and FIG. 21 are fixed to the second longitudinal members 1111 shown there and support members such as not shown first and second support members are omitted.

Note, according to this embodiment, when the sizes of the recesses a and projections b of the longitudinal members 11 (or the first longitudinal members 11 shown in FIG. 18 or the first and second longitudinal members 11, 1111 shown in FIG. 20) are set to predetermined values and the longitudinal members 11 are abutted against the longitudinal members 11 (or, the first longitudinal members 11 shown in FIG. 18 are abutted against the second longitudinal members 111 shown there or the first longitudinal members 11 shown in FIG. 20 are abutted against the second longitudinal members 1111 shown there), slits each having a predetermined size can be accurately and easily formed between the longitudinal members 11 (or between the first longitudinal members 11 shown in FIG. 18 and the second longitudinal members 111 shown there or between the first longitudinal members 11 shown in FIG. 20 and the second longitudinal members 1111 shown there), and accordingly the screen plates 10, 101 which can be easily manufactured can be obtained.

What is claimed is:

1. A method of manufacturing a paper making screen plate, comprising:

preparing a plurality of first longitudinal members, each first longitudinal member having a plurality of first cylindrical projections and at least one first cylindrical recess situated between the first cylindrical projections so that each of the first longitudinal members has a circular shape in cross section perpendicular to a longitudinal direction thereof throughout a substantially entire length thereof, preparing a plurality of second longitudinal members having a circular shape in cross section perpendicular to a longitudinal direction thereof throughout a substantially entire length thereof, preparing first and second support members, disposing both ends of the respective first and second longitudinal members on the first and second support members, said first and second longitudinal members being arranged alternately and parallel to each other so that the cylindrical projections of the first longitudinal members abut against the second longitudinal members and the first cylindrical recess forms a slit relative to the second longitudinal member facing thereto, each slit having wide outer portions and a narrow middle portion between the wide outer portions and being defined by smooth curved surfaces of first and second longitudinal members situated adjacent to each other, and fixing the first and second longitudinal members on the first and second support members.

2. A method according to claim 1, wherein said second longitudinal member is a cylindrical rod having a predetermined diameter throughout the substantially entire length thereof, which is same as a diameter of the first cylindrical recess.

3. A method according to claim 1, wherein said second longitudinal member has at least one second cylindrical projection abutting against the first cylindrical recess, and at least two second cylindrical recesses situated on both sides of the second cylindrical projection, said first cylindrical projections abutting against the second cylindrical recesses, said slit being formed between the first and second cylindrical recesses.

4. A method according to claim 3, wherein said second cylindrical projection and said second cylindrical recesses have diameters as in the first cylindrical projections and first cylindrical recess, respectively.

5. A method according to claim 1, wherein said second longitudinal member has a plurality of second cylindrical projections and at least one second cylindrical recess to have a shape as in the first longitudinal member, said first and second cylindrical projections abutting against each other and said slit being defined between the first and second cylindrical recesses.

6. A method according to claim 5, wherein said first and second cylindrical projections are located at both ends and middle portions of the first and second longitudinal members.

7. A method according to claim 6, wherein the first and second support members have annular shapes and include annular slits on side portions thereof, both ends of the first and second longitudinal members being situated in the annular slits so that the first and second support members support longitudinal and lateral directions of the first and second longitudinal members.

8. A method according to claim 1, wherein the first and second support members have annular shapes and include annular slits on side portions thereof, both ends of the first and second longitudinal members being situated in the annular slits so that the first and second support members support longitudinal and lateral directions of the first and second longitudinal members.

9. A method according to claim 1, wherein said first and second support members are flat to form a flat screen by the first and second support members.

* * * * *